United States Patent
Choi

(10) Patent No.: US 10,847,850 B2
(45) Date of Patent: Nov. 24, 2020

(54) COOLING PLATE FOR SECONDARY BATTERY AND SECONDARY BATTERY MODULE INCLUDING THE SAME

(71) Applicant: LG Chem, Ltd., Seoul (KR)

(72) Inventor: Seung Ryul Choi, Daejeon (KR)

(73) Assignee: LG Chem, Ltd. (KR)

(*) Notice: Subject to any disclaimer, the term of this patent is extended or adjusted under 35 U.S.C. 154(b) by 210 days.

(21) Appl. No.: 15/515,221

(22) PCT Filed: Nov. 10, 2015

(86) PCT No.: PCT/KR2015/012048
§ 371 (c)(1),
(2) Date: Mar. 29, 2017

(87) PCT Pub. No.: WO2016/080696
PCT Pub. Date: May 26, 2016

(65) Prior Publication Data
US 2017/0222283 A1 Aug. 3, 2017

(30) Foreign Application Priority Data

Nov. 17, 2014 (KR) .................... 10-2014-0160228
Nov. 4, 2015 (KR) .................... 10-2015-0154411

(51) Int. Cl.
*H01M 10/613* (2014.01)
*H01M 10/6557* (2014.01)
(Continued)

(52) U.S. Cl.
CPC ..... *H01M 10/613* (2015.04); *H01M 10/6555* (2015.04); *H01M 10/6557* (2015.04);
(Continued)

(58) Field of Classification Search
CPC .......... H01M 10/613; H01M 10/6557; H01M 10/6569; H01M 10/6555; H01M 10/653;
(Continued)

(56) References Cited

U.S. PATENT DOCUMENTS 6,586,132 B1* 7/2003 Fukuda .............. H01M 2/1077
429/120
8,465,864 B1 6/2013 Kwak et al.
(Continued)

FOREIGN PATENT DOCUMENTS

CN 1838463 A 9/2006
CN 1855596 A 11/2006
(Continued)

OTHER PUBLICATIONS

English Translation of JP-2011238457-A.*
(Continued)

*Primary Examiner* — Milton I Cano
*Assistant Examiner* — Kiran Akhtar
(74) *Attorney, Agent, or Firm* — Lerner, David, Littenberg, Krumholz & Mentlik, LLP

(57) ABSTRACT

The present invention relates to a flat plate type cooling plate for a secondary battery, which includes a plurality of cooling parts spaced apart from each other in a longitudinal direction within the cooling plate and a plurality of reinforcement ribs disposed on inner surfaces of the cooling parts. The cooling plate for the secondary battery according to the present invention may be minimized in deformation due to an external impact and stimulation when the cell module is penetrated and thus reduce an influence on unit cells due to the deformation of the cooling plate to suppress an occurrence of short-circuit in the unit cells of the cell module, thereby improving safety of the battery. Also, heat generated during charging and discharging may be effectively released (Continued)

to prevent the battery from being deteriorated in capacity characteristic and improve lifespan characteristics of the battery and reliability of battery performance.

21 Claims, 9 Drawing Sheets

(51) Int. Cl.
*H01M 10/6569* (2014.01)
*H01M 10/6555* (2014.01)
*H01M 10/653* (2014.01)
*H01M 10/647* (2014.01)
*H01M 10/6556* (2014.01)
*H01M 2/10* (2006.01)

(52) U.S. Cl.
CPC .......... *H01M 10/6569* (2015.04); *H01M 2/10* (2013.01); *H01M 10/647* (2015.04); *H01M 10/653* (2015.04); *H01M 10/6556* (2015.04)

(58) Field of Classification Search
CPC ... H01M 10/6556; H01M 10/647; H01M 2/10
See application file for complete search history.

(56) References Cited

U.S. PATENT DOCUMENTS

| | | | |
|---|---|---|---|
| 2002/0160257 A1 | 10/2002 | Lee et al. | |
| 2002/0160258 A1 | 10/2002 | Lee et al. | |
| 2003/0013012 A1 | 1/2003 | Ahn et al. | |
| 2004/0142238 A1* | 7/2004 | Asahina | B60L 3/0046 429/176 |
| 2005/0287426 A1* | 12/2005 | Kim | H01M 2/0247 429/149 |
| 2006/0204840 A1* | 9/2006 | Jeon | H01M 2/1077 429/152 |
| 2006/0214641 A1* | 9/2006 | Cho | H01M 10/6556 320/150 |
| 2007/0104988 A1 | 5/2007 | Nishii et al. | |
| 2011/0052960 A1* | 3/2011 | Kwon | H01M 10/0481 429/120 |
| 2011/0189525 A1 | 8/2011 | Palanchon et al. | |
| 2011/0305935 A1 | 12/2011 | Yoon | |
| 2012/0070711 A1* | 3/2012 | Souki | H01M 10/6566 429/120 |
| 2012/0263980 A1 | 10/2012 | Soukhojak et al. | |
| 2012/0315529 A1 | 12/2012 | Jin | |
| 2017/0222283 A1 | 8/2017 | Choi | |

FOREIGN PATENT DOCUMENTS

| | | | |
|---|---|---|---|
| CN | 205595422 U | 9/2016 | |
| EP | 0044561 A2 | 1/1982 | |
| EP | 2337141 A1 | 6/2011 | |
| JP | 2005203148 A | 7/2005 | |
| JP | 2006012847 A | 1/2006 | |
| JP | 2006253149 A | 9/2006 | |
| JP | 2010073406 A | 4/2010 | |
| JP | 2011238457 A | 11/2011 | |
| JP | 2011238457 A * | 11/2011 | ............ H01M 10/60 |
| JP | 2012015071 A | 1/2012 | |
| JP | 2012043655 A | 3/2012 | |
| JP | 2012069284 A | 4/2012 | |
| JP | 2012119156 A | 6/2012 | |
| JP | 2013084444 A | 5/2013 | |
| JP | 2013519189 A | 5/2013 | |
| JP | 2013161720 A | 8/2013 | |
| KR | 20010082058 A | 8/2001 | |
| KR | 20010082059 A | 8/2001 | |
| KR | 20010082060 A | 8/2001 | |
| KR | 20060085775 A | 7/2006 | |
| KR | 20060099216 A | 9/2006 | |
| KR | 20080010156 A | 1/2008 | |
| KR | 101084224 B1 | 11/2011 | |
| KR | 20120048938 A | 5/2012 | |
| KR | 20130091211 A | 8/2013 | |
| WO | 2011094863 A1 | 8/2011 | |
| WO | 2012156363 A1 | 11/2012 | |

OTHER PUBLICATIONS

Extended European Search Report for Application No. EP15861814.0 dated Oct. 10, 2017.
International Search Report from PCT/KR2015/012048, dated Mar. 2, 2016.

\* cited by examiner

COOLING PLATE FOR SECONDARY BATTERY AND SECONDARY BATTERY MODULE INCLUDING THE SAME

CROSS REFERENCE TO RELATED APPLICATIONS

The present application is a national phase entry under 35 U.S.C. § 371 of International Application No. PCT/KR2015/012048, filed Nov. 10, 2015, published in Korean, which claims the benefit of Korean Patent Application No. 10-2014-0160228 filed on Nov. 17, 2014, with the Korean Intellectual Property Office and Korean Patent Application No. 10-2015-0154411 filed on Nov. 4, 2015, with the Korean Intellectual Property Office, the disclosures of which are herein incorporated by reference in their entirety.

TECHNICAL FIELD

The present invention relates to a cooling plate for a secondary battery, which has a superior cooling effect and is capable of being minimized in deformation due to an external impact and stimulation when a battery module is penetrated and thus reduces an influence on unit cells adjacent thereto to improve safety of the battery, and a secondary battery module including the same.

BACKGROUND ART

As technical development and demands for mobile devices are increasing, demands for batteries as energy sources are rapidly increasing. Thus, many studies on batteries which are capable of meeting various demands have been conducted.

Typically, there are high demands for pouch-type secondary batteries which are capable of being applied to products such as mobile phones having thin thicknesses in terms of the shapes of the batteries. Also, there are high demands for lithium secondary batteries such as lithium ion batteries and lithium ion polymer batteries, which have high energy densities, high discharge voltages, and excellent output safety in terms of the materials of the batteries.

The secondary batteries may have various shapes such as a cylindrical shape and a prismatic shape. When secondary batteries are used for driving a device, which requires high power, for example, a motor of an electric vehicle, a plurality of unit cells, each of which is provided as one secondary battery, may be connected to each other in series to constitute a secondary battery assembly (hereinafter, referred to as a 'battery module') having large capacity.

Each of the unit cells constituting the battery module includes an electrode assembly in which a positive electrode plate, a negative electrode plate, and a separator interposed between the positive electrode plate and the negative electrode plate are stacked, a battery case having a space part in which the electrode assembly is built, and positive and negative electrode terminals which are partially exposed to the outside of the battery case and electrically connected to collectors of the positive and negative electrode plates provided in the electrode assembly. Also, in each of the unit cells, for example, in case of the secondary battery having the prismatic shape, the positive and negative electrode terminals protruding upward from the battery case are arranged to cross the positive and negative electrode terminals of the adjacent unit cells, and then, the negative electrode terminals and the positive electrode terminals may be connected to each other to constitute the battery module.

Here, since the battery module is manufactured by connecting several to several tens of unit cells to each other, heat generated from each of the unit cells has to be easily released.

The heat release characteristics of the battery module may be very important in that performance of the cells depends on the heat release characteristics. When the cell is charged or discharged, heat transfer occurs. Here, the quantity of generated heat may be proportional to capacity of the unit cells, i.e., the number of stacked unit cells. The heat during the charging and discharging may be released during a rest step. Here, when the cell has a thick thickness, the heat generated during the charging and discharging tends not to be sufficiently released during the rest step. As described above, when the generated heat is accumulated in the cell, an inner temperature of the cell may increase, resulting in deterioration of the cell performance. Also, in severe cases, the increase of the inner temperature of the cell may cause a risk of explosion. Particularly, when the battery module is applied to high-capacity secondary batteries for driving an electric cleaner, an electric scooter, or a motor of a vehicle, the temperature of the cell may increase up to a significant temperature due to the heat generated in the cells because the cells are charged or discharged at high current.

Thus, development of a cooling plate that is capable of effectively releasing the heat generated in the battery module is required.

PRIOR ART DOCUMENTS

[Patent Document 1] Korean Patent Publication No. 2012-0048938 (Published in May 16, 2012).

DISCLOSURE OF THE INVENTION

Technical Problem

A first technical object to be solved by the present invention is to provide a cooling plate for a secondary battery, which has a superior cooling effect and is capable of being minimized in deformation due to an external impact and stimulation when a battery module is penetrated and thus reduces an influence on unit cells adjacent thereto to improve safety of the battery such as depression in occurrence of short-circuit.

A second technical object to be solved by the present invention is to provide a secondary battery module including a cooling plate and a battery pack.

However, the objects of the present invention are not limited to the aforesaid, but other objects not described herein will be clearly understood by those skilled in the art from descriptions below.

Technical Solution

To solve the above-described objects, according to an embodiment of the present invention, provided is a flat plate type cooling plate for a secondary battery, which includes a plurality of cooling parts spaced apart from each other in a longitudinal direction within the cooling plate and a plurality of reinforcement ribs disposed on inner surfaces of the cooling parts.

Also, according to another embodiment of the present invention, provided is a secondary battery module in which a plurality of chargeable/dischargeable unit cells are arranged at a predetermined interval, wherein the cooling plate is interposed between the unit cells.

Furthermore, according to further another embodiment of the present invention, provided is a battery pack including the secondary battery module.

Details of other embodiments are included in the following detailed description.

Advantageous Effects

The cooling plate for the secondary battery according to the present invention may be minimized in deformation due to the external impact and stimulation when the battery module is penetrated and thus reduce the influence on the unit cells due to the deformation of the cooling plate to suppress the occurrence of the short-circuit in the unit cells of the battery module, thereby improving the safety of the battery. Also, the heat generated during the charging and discharging may be effectively released to prevent the cell from being deteriorated in capacity characteristic and improve the lifespan characteristics of the cell and the reliability of the cell performance.

BRIEF DESCRIPTION OF THE DRAWINGS

The following drawings attached in this specification illustrate a preferred embodiment of the present invention and function to make further understood the technical spirit of the present invention along with the detailed description of the invention, and thus, the present invention should not be construed as being limited to only the drawings.

MODE FOR CARRYING OUT THE INVENTION

Figure 1:
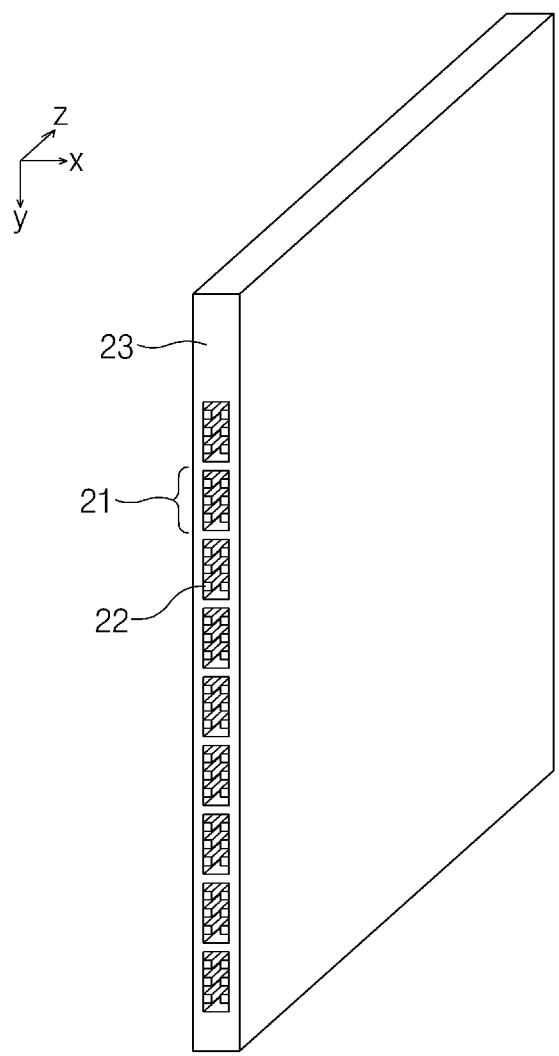
FIG. 1 is a schematic perspective view illustrating a structure of a cooling plate for a secondary battery according to an embodiment of the present invention.

Hereinafter, constitutions and effects according to the present invention will be described with reference to the accompanying drawings. In descriptions with reference to the accompanying drawings, the same reference numeral will be given to the same component regardless of reference symbols, and thus, its duplicated description will be omitted.

It will be understood that although the terms such as 'first' and 'second' are used herein to describe various elements, these elements should not be limited by these terms. The terms are only used to distinguish one component from other components.

Cooling Plate

FIG. 1 is a schematic perspective view illustrating a structure of a cooling plate for a secondary battery according to an embodiment of the present invention. FIG. 1 illustrates merely an example for explaining the present invention, and thus, the present invention is not limited thereto.

Hereinafter, explaining with reference to FIG. 1, a cooling plate 20 for a secondary battery according to an embodiment of the present invention may be a flat plate-type cooling plate. In the cooling plate 20, a plurality of cooling parts 21 are disposed to be spaced apart from each other in a longitudinal direction (a y-axis direction) thereof, and a plurality of reinforcement ribs 22 are disposed on inner surfaces of the cooling parts 21. Also, a reinforcement part 23 for installing and supporting the cooling plate 20 in the secondary battery module may be further provided on an upper portion of the cooling part 21.

In general, the cooling plate may be interposed between unit cells to prevent the unit cells from being expanded in volume or damaged and may quickly release heat generated in the unit cells to the outside to improve cooling efficiency of the unit cells.

The flat plate-type cooling plate made of an aluminum material is mainly used as the typical cooling plate. Here, the unit cells may be densely disposed because an available space in the battery module is insufficient. As a result, when an external impact is applied in the nail penetration test, deformation in a vertical direction may occur in the cooling plate, and thus, the adjacent unit cells may be deformed to cause short-circuit. Also, heat generated in the unit cells during the charging and discharging, particularly, during the charging and discharging at a high temperature may not be sufficiently cooled during the rest step in a charging/discharging cycle, but be accumulated to accelerate degeneracy of the cells, thereby deteriorating lifespan characteristics of the cells and reliability of the cell performance.

On the other hand, according to the present invention, the cooling part 21 having an empty space in the cooling plate 20 may be provided so that deformation of the cooling plate may be minimized to reduce deformation of the adjacent unit cells, resulting in suppression of the occurrence of the short-circuit when an external impact and stimulation is applied in the nail penetration test. Also, the reinforcement ribs 22 may be disposed on the cooling part 21 to realize an uneven structure. As a result, a reinforcing effect may be improved, and the heat generated during the charging and discharging may be effectively released through the spaces to improve safety and lifespan characteristics of the battery and reliability of the battery performance.

Particularly, in the cooling plate 20 according to an embodiment of the present invention, the plurality of cooling parts 21 are disposed to be spaced apart from each other in the longitudinal direction (the y-axis direction) thereof, and the plurality of reinforcement ribs 22 may be disposed on the inner surfaces of the cooling parts 21.

More particularly, the cooling plate 20 may be a single structure in which the above-described cooling parts 21 are formed or at least two-layered structure in which at least two plates are disposed to face each other so that the above-described cooling parts 21 are formed.

When the cooling plate has the two-layered structure, the cooling plate may include a first plate and a second plate, which are separably coupled to each other, and a plurality of cooling parts disposed to be spaced apart from each other in a longitudinal direction (the y-axis direction) of the cooling plate between the first plate and the second plate. In addition, a plurality of reinforcement ribs may be disposed on inner surfaces of the cooling parts. The reinforcement ribs may include a plurality of first ribs protruding from the first plate and a plurality of second ribs protruding from the second plate.

Here, each of the first and second plates may independently have a thickness greater 0.2 times to 0.5 times than that of the cooling plate, more particularly, greater 0.25 times to 0.4 times than that of the cooling plate.

Each of the plurality of first ribs protruding from the first plate may have a width of 0.1 mm to 1 mm, and the first ribs may be disposed to be spaced a distance of 0.1 mm to 1 mm from each other within the unit cooling part. In the first ribs, the unit ribs may have the same width and the same spaced distance therebetween or have different widths and different spaced distances therebetween within the above-described ranges.

Each of the first ribs may have a height corresponding to a thickness greater 0.1 times to 0.3 times than that of the cooling plate, more particularly, greater 0.15 times to 0.25 times than that of the cooling plate. In the first ribs, the unit ribs may have heights equal to or different from each other within the above-described range.

Each of the plurality of second ribs protruding from the second plate may have a width of 0.1 mm to 1 mm, and the second ribs may be disposed to be spaced a distance of 0.1 mm to 1 mm from each other within the unit cooling part. In the second ribs, the unit ribs may have the same width and the same spaced distance therebetween or have different widths and different spaced distances therebetween within the above-described ranges.

Each of the second ribs may have a height corresponding to a thickness greater 0.1 times to 0.3 times than that of the cooling plate, more particularly, greater 0.15 times to 0.25 times than that of the cooling plate. In the second ribs, the unit ribs may have heights equal to or different from each other within the above-described range.

Each of the first and second ribs may have the same width or different widths within the above-described range.

The first and second ribs may be disposed to be spaced the same distance from each other so that the first and second ribs are disposed to correspond to or cross each other within the above-described range. Alternatively, the first and second ribs may be disposed to be spaced different distances from each other so that the first and second ribs are disposed to partially correspond to each other.

The first and second ribs may have the same height or different heights.

The first and second ribs may independently have various shapes such as a rectangular shape, a hemispherical shape, a pyramid shape, and a combination of one or more shapes. The first and second ribs may have the same shape or different shapes.

Also, a partition part partitioning the plurality of cooling parts may be further disposed between the first and second plates within the cooling plate 20. The partition part may protrude from an inner surface of each of the first and second plates so that ends thereof meet each other.

Particularly, the partition part may have a width of 0.1 mm to 2 mm, more particularly, a width of 0.5 mm to 1 mm.

In the cooling plate 20, the first and second ribs may be disposed to face each other.

Particularly, the ends of the first and second ribs may be spaced a predetermined distance from each other to face each other. Here, the ends of the first and second ribs may be spaced a distance corresponding to a thickness greater 0.05 times to 0.15 times than that of the cooling plate, more particularly, greater 0.1 times to 0.14 times than that of the cooling plate from each other to face each other.

In the cooling plate 20, the first and second ribs may be disposed to cross each other.

Here, the ends of the first and second ribs may overlap each other. Alternatively, the ends of the first and second ribs may be disposed in a straight line.

When the ends of the first and second ribs overlap each other, the ends of the first and second ribs may overlap each other by a height corresponding to a thickness greater 0.05 times to 0.1 times than that of the cooling plate, more particularly, greater 0.06 times to 0.08 times than that of the cooling plate.

Figure 2:
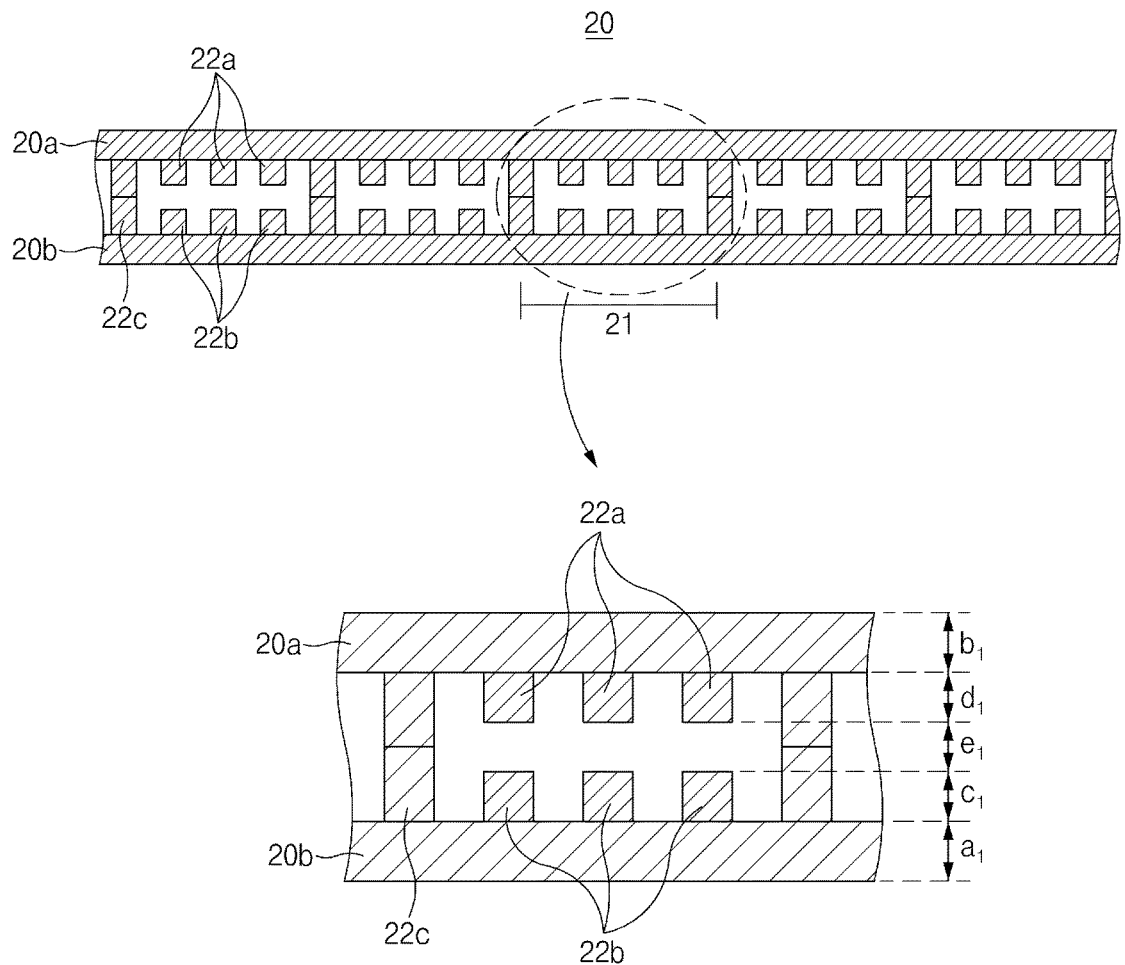
FIG. 2 is a perspective view of a cooling part having various structures in the cooling plate for the secondary battery according to an embodiment of the present invention.
Figure 3:
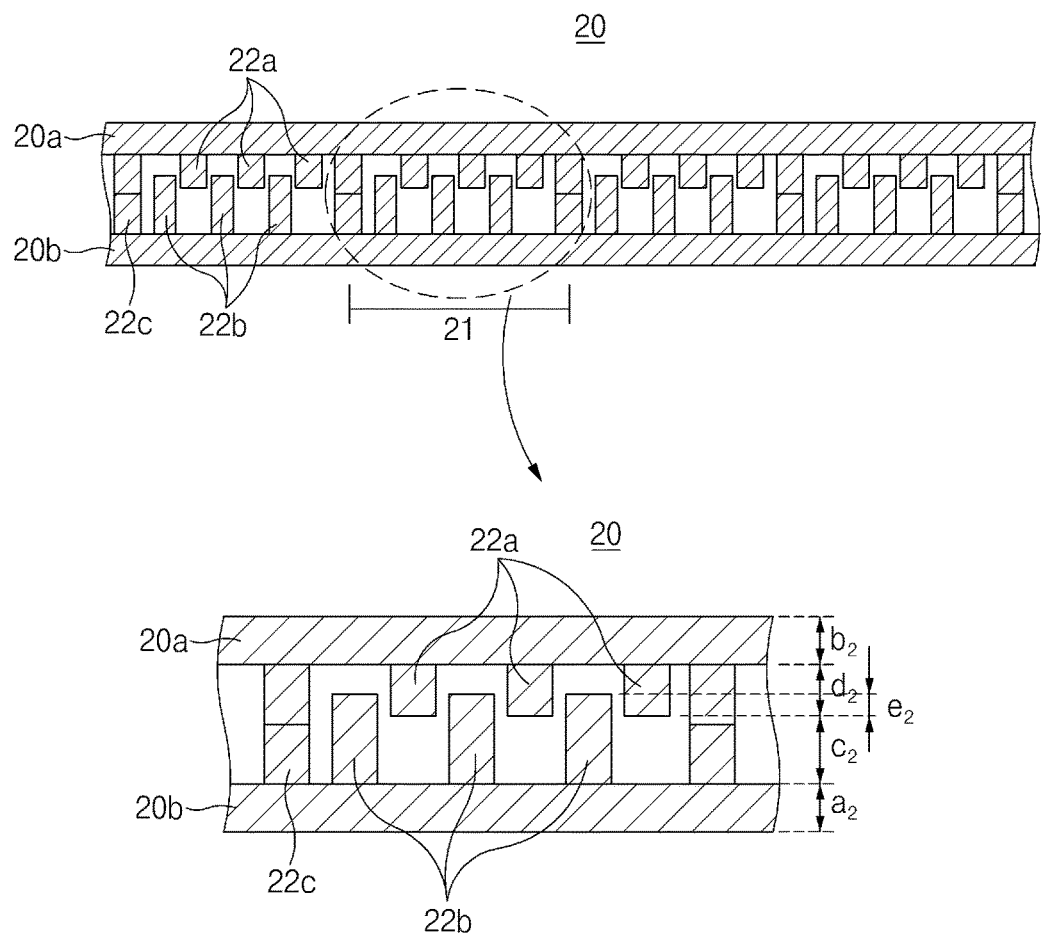
FIG. 3 is a perspective view of a cooling part having various structures in the cooling plate for the secondary battery according to an embodiment of the present invention.
Figure 4:
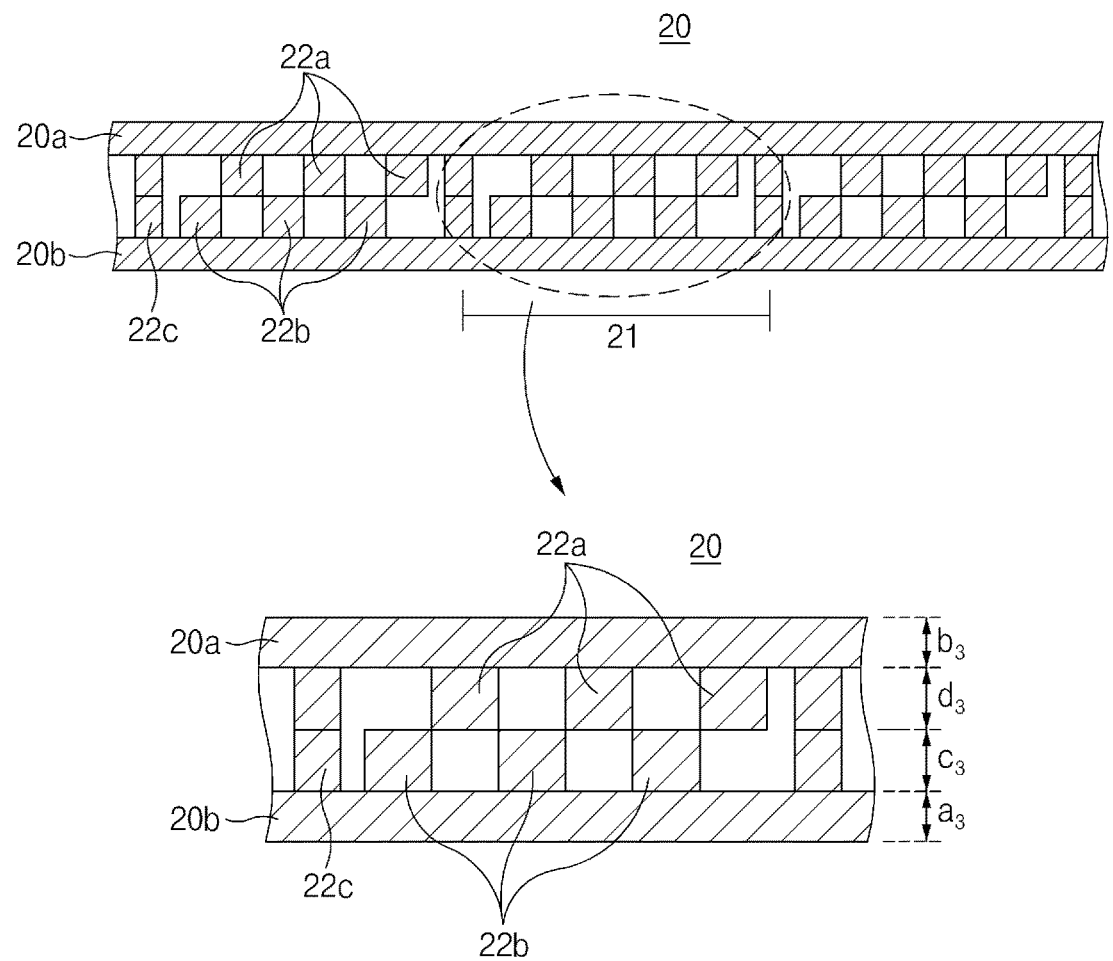
FIG. 4 is a perspective view of a cooling part having various structures in the cooling plate for the secondary battery according to an embodiment of the present invention.

FIGS. 2 to 4 illustrate various shapes of the reinforcement rib protruding within the cooling part of the cooling part in the cooling plate having the two-layered structure. FIGS. 2 to 4 illustrate merely examples for explaining the present invention, and thus, the present invention is not limited thereto.

Hereinafter, explaining with reference to FIGS. 2 to 4, when the cooling plate 20 has the two-layered structure, the cooling plate 20 may include a first plate 20a and a second plate 20b, which are separably coupled to each other, and a plurality of cooling parts 21 disposed to be spaced apart from each other in the longitudinal direction (the y-axis direction) of the cooling plate. In addition, a plurality of reinforcement ribs 22 may be disposed on inner surfaces of the cooling parts 21. The reinforcement ribs 22 may include a plurality of first ribs 22a protruding from the first plate 20a and a plurality of second ribs 22b protruding from the second plate 20b.

Also, a partition part 21c partitioning the plurality of cooling parts 21 may be further disposed between the first and second plates 20a and 20b. The partition part 21c may protrude from an inner surface of each of the first and second plates 20a and 20b so that ends thereof meet each other.

In the cooling plate 20, specific characteristics of the first and second plates 20a and 20b, the first and second ribs 22a and 22b, and the partition part 22c are as described above. In FIG. 2, reference symbol a1 represents a thickness of the first plate 20a, reference symbol b1 represents a thickness of the second plate 20b, reference symbol c1 represents a height of the first rib 22a, reference symbol d1 represents a height of the second rib 22b, and reference symbol e1 represents a distance (or a spaced distance) between ends of the first and second ribs 22a and 22b. Here, the specific values are as described above.

In the cooling plate 20, the first and second ribs 22a and 22b may be disposed to face each other.

Particularly, as illustrated in FIG. 2, the ends of the first and second ribs 22a and 22b may be spaced a predetermined distance from each other to face each other. More particularly, the ends of the first and second ribs 22a and 22b may be spaced a spaced distance e1 corresponding to a thickness greater 0.05 times to 0.15 times than that of the cooling plate from each other to face each other.

In this case, the total length (a1+b1+c1+d1+e1) of the thicknesses a1 and b1 of the first and second plates 20a and 20b, the heights c1 and d1 of the first and second ribs 22a and 22b, and the spaced distance e1 between the ends of the first and second ribs 22a and 22b corresponds to a thickness of the cooling plate 20.

In the cooling plate 20, the first and second ribs 22a and 22b may be disposed to cross each other.

Here, the ends of the first and second ribs 22a and 22b may overlap each other as illustrated in FIG. 3 or be disposed in a straight line as illustrated in FIG. 4.

When the ends of the first and second ribs 22a and 22b overlap each other, the ends of the first and second ribs 22a and 22b may overlap each other by a height e2 corresponding to a thickness greater 0.05 times to 0.1 times than that of the cooling plate 20, more particularly, greater 0.06 times to 0.08 times than that of the cooling plate 20. In this case, a length (a1+b1+c1+d1−e1) obtained by subtracting the overlapping height e2 of the first and second ribs 22a and 22b from the total length of thicknesses a2 and b2 of the first and second plates 20a and 20b and heights c2 and d2 of the first and second ribs 22a and 22b corresponds to the thickness of the cooling plate 20.

When the ends of the first and second ribs 22a and 22b are disposed in the straight line, the total length (a3+b3+c3+d3) of thicknesses a3 and b3 of the first and second plates 20a and 20b and heights c3 and d3 of the first and second ribs 22a and 22b corresponds to the thickness of the cooling plate 20.

The cooling plate 20 may further include a reinforcement part 23 for installing and supporting the cooling plate within the secondary battery module on an upper portion of the cooling part 21. Thus, in the cooling plate 20, a surface on which the cooling part 21 is disposed may come into contact with a heat generation surface of a unit cell, and the reinforcement part 22 may pass outside the unit cell.

Particularly, the reinforcement part 23 may be a rectangular flat plate. The reinforcement part 23 may be integrated with the upper portion of the cooling part 21 or may be provided as a separate member and then bonded to the cooling part 21 through welding.

Particularly, the cooling plate 20 may have a flat plate shape and also have a size corresponding to an entire surface of the unit cell. The cooling plate 20 may have an entire surface coming into contact with an entire surface of one side of the unit cell and one end passing outside the unit cell. Thus, cooling air supplied to the secondary battery module may flow through a mesh within the cooling plate to release heat transferred to the cooling plate to the outside.

The cooling plate 20 may be not particularly limited to a material thereof if the material is used for manufacturing a general cooling plate. Particularly, the cooling plate 20 may be made of aluminum, an aluminum alloy, stainless steel, copper, silver, or aluminum oxide. Here, the cooling plate 20 may be made of one kind of these alone or a mixture of two or more kinds of them. More particularly, the cooling plate 20 may include aluminum or an aluminum alloy. Each of the first plate, the second plate, the first rib, the second rib, the partition part, and the reinforcement part, which constitute the cooling plate, may be made of the same material as the above-described material.

The cooling plate 20 may have a thickness of 1.5 mm to 3 mm, more particularly, 1.7 mm to 2 mm.

It is preferable that the cooling plate 20 has an aperture ratio of 70% by volume to 90% by volume. When the cooling plate 20 has an aperture ratio within the above-described range, the deformation of the cooling plate may be prevented, and simultaneously, the cooling efficiency may be improved.

Secondary Battery Module

According to another embodiment of the present invention, a secondary battery module including the above-described cooling plate is provided.

Particularly, in the secondary battery module, a plurality of chargeable/dischargeable unit cells are arranged at a predetermined distance, and the cooling plate is interposed between the unit cells.

Figure 5:
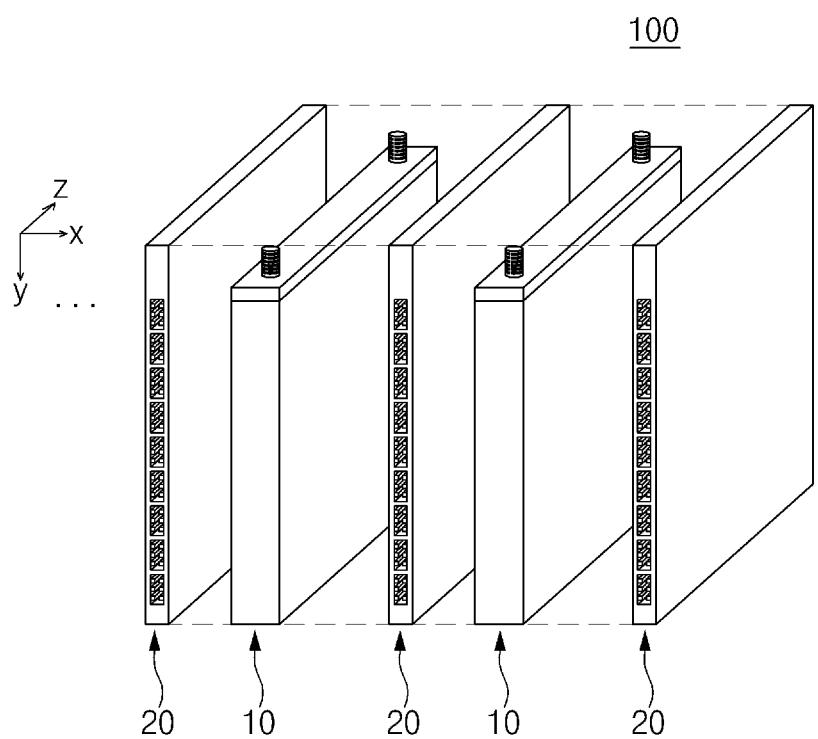
FIG. 5 is a schematic exploded perspective view illustrating a structure of a secondary battery module according to an embodiment of the present invention.

FIG. 5 is a schematic exploded perspective view illustrating a structure of the secondary battery module according to an embodiment of the present invention. FIG. 5 illustrates merely an example for explaining the present invention, and thus, the present invention is not limited thereto.

Hereinafter, explaining with reference to FIG. 5, in a secondary battery module 100 according to an embodiment of the present invention, a plurality of chargeable/dischargeable unit cells 10 are arranged at a predetermined distance, and a flat plate-type cooling plate 20 is interposed between the unit cells 10. In addition, a plurality of cooling parts 21 are disposed to be spaced apart from each other in a longitudinal direction (a y-axis direction) of the cooling plate 20 within the cooling plate 20, and a plurality of reinforcement ribs 22 are disposed on inner surfaces of the cooling parts 21.

More particularly, in the secondary battery module 100, the plurality of unit cells are electrically connected in series or parallel to each other by a connector (not shown) and also modulated by being clamped through a binding band (not shown). Here, the secondary battery module 100 includes the cooling plate 20 disposed between the unit cells 10. The secondary battery module 100 may further include an ending plate (not shown) for preventing the unit cells 10 from being damaged when the unit cells 10 are clamped by using the binding band.

The secondary battery module may be installed within a separate housing (not shown) defining an external case. Here, cooling air supplied to the housing may pass through the cooling plate 20 interposed between the unit cells 10. In this process, heat generated in the unit cells may be heat-exchanged with the air, and the heat-exchanged air may be discharged to the outside of the housing to release the heat generated in the unit cell to the outside.

In the secondary battery module 100, the unit cell 10 may be a unit that includes an electrode assembly, in which a positive electrode plate and a negative electrode plate are disposed with a separator therebetween, to produce electricity. The secondary battery module 100 may be provided to be accommodated in a battery case.

Particularly, the unit cell 10 may include the electrode assembly, the battery case having an inner space in which the electrode assembly is accommodated, positive and negative electrode leads, each of which has one side end (e.g., one end) connected to the electrode assembly and the other side end (e.g., the other end) protruding to the outside of the battery case, and a sealing part sealing an inlet of the battery case.

The battery case of the unit cell 10 may be a pouch-type battery case constituted by an upper laminate sheet and a lower laminate sheet. The battery case may have a structure in which the upper and lower laminate sheets are thermally fused along an outer circumferential surface of the battery case to form the sealing part.

Each of the upper and lower laminate sheets constituting the battery case may be a laminate sheet including a metal layer and a resin layer covering the metal layer. In more particularly, the laminate sheet may have a multilayer structure in which a polyolepin-based resin layer that is an inner layer that has a thermal compression bonding property to function as a sealing material, a metal thin film layer (mainly, an aluminum layer) that has mechanical strength and functions as a barrier layer of moisture and oxygen, and an outer layer (mainly, a nylon layer) that acts as a protection layer are successively laminated. Casted polypropylene that is generally used may be used for the polyolepin-based resin layer.

The sealing part may be formed by applying heat and a pressure to the outer circumferential surface, on which the upper and lower laminate sheets of the battery case come into contact with each other, to mutually thermally fuse the resin layers. Here, since the upper and lower laminate sheets are the same resin layer, a portion of the outer circumferential surface on which the electrode leads are not seated may be uniformly sealed by direct melting. Particularly, the thermal compression process may be performed under conditions such as a temperature of 120° C. to 250° C. and a pressure of 0.1 Mpa to 10 MPa by using electric heat and a press.

On the other hand, since the electrode leads protrude from the outer circumferential surface of the upper end of the battery case on which the electrode leads are seated, it is preferable that the thermal compression is performed in a state in which an insulation film is interposed between the battery case and each of the electrode leads so that sealing performance in consideration of a thickness of each of the electrode leads and heterogeneity in material of the electrode lead and the battery case, but is not certainly limited thereto.

If the electrode assembly has a structure in which a plurality of electrode tabs are connected to each other to constitute the positive and negative electrodes, the electrode assembly is not particularly limited to a structure thereof.

Particularly, the electrode assembly may be a stack-type electrode assembly in which a positive electrode plate including a positive electrode active material coating portion on at least one surface of a positive electrode collector and a negative electrode plate including a negative electrode active material coating portion on at least one surface of a negative electrode collector are stacked with a separator therebetween.

Alternatively, the electrode assembly may be a jelly-roll-type electrode assembly in which a positive electrode plate including a positive electrode active material coating portion on at least one surface of a positive electrode collector and a negative electrode plate including a negative electrode active material coating portion on at least one surface of a negative electrode collector are wound with a separator therebetween to face each other.

Alternatively, the electrode assembly may be a stacking/folding-type electrode assembly in which a unit electrode assembly, in which a positive electrode plate including a positive electrode active material coating portion on at least one surface of a positive electrode collector and a negative electrode plate including a negative electrode active material coating portion on at least one surface of a negative electrode collector are stacked with a separator therebetween, is provided in plurality to overlap each other, and a separation film is interposed between the overlapping portions, wherein the separation film surrounds each of the unit electrode assemblies.

Since the stacking/type and jelly-roll-type structures are widely known in the art, their descriptions will be omitted in this specification. Also, the details of the stacking/folding-type electrode assembly are disclosed in Korean Patent Publication Nos. 2001-0082058, 2001-0082059, and 2001-0082060, filed by the present applicant, which are hereby incorporated by reference in their entirety.

More particularly, in the secondary battery according to an embodiment of the present invention, the electrode assembly may be the stacking/folding-type electrode assembly.

In the electrode assembly, a negative electrode plate includes a negative electrode collector and a negative electrode active material coating portion in which at least one surface, preferably, both surfaces of the negative electrode collector are coated with a negative electrode active material.

In the negative electrode plate, the negative electrode collector may not be particularly limited so long as any negative electrode collector has suitable conductivity without causing adverse chemical changes in the cell. For example, the negative electrode collector may include copper, stainless steel, aluminum, nickel, titanium, sintered carbon, copper or stainless steel having a surface treated with carbon, nickel, titanium, or silver, and an aluminum-cadmium alloy.

The negative electrode collector may have a thickness of 3 μm to 500 μm.

A fine unevenness may be formed on a surface of the negative electrode collector to reinforce coupling force of the negative electrode active material. For example, the negative electrode collector may have various shapes such as a film, a sheet, a foil, a net, a porous body, a foam body, or a non-woven fabric.

The negative electrode active material coating portion includes the negative electrode active material, a binder, and a conductive material.

A compound capable of reversible lithium intercalation and deintercalation may be used as the negative electrode active material. Exemplary examples of the negative electrode active material may include a carbonaceous material such as artificial graphite, natural graphite, graphitizable carbon fiber, and amorphous carbon; a metal compound being capable of alloying with lithium such as Si, Al, Sn, Pb, Zn, Bi, In, Mg, Ga, Cd, Si alloys, Sn alloys, and Al alloys; or a composite including the metal compound and the carbonaceous material; or a silicon-based compound such as $SiO_x(0<x<2)$, and one kind of these alone or a mixture of two or more kinds of them may be used. Also, a metal lithium thin film may be used as the negative electrode active material.

The binder may improve attachment between negative electrode active material particles and adhesion force between the negative electrode active material and the negative electrode collector. Exemplary examples of the binder may include polyvinylidene fluoride (PVDF), polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated-EPDM, ethylene-(meth)acrylic copolymers, styrene-butylene rubber, fluoro rubber, or various copolymers thereof, and one kind of these alone or a mixture of two or more kinds of them may be used.

The binder may be contained at a content of 1 wt % to 30 wt % on the basis of the total weight of the negative electrode active material coating portion.

The conductive material may be used to give conductivity to the electrode and may not be particularly limited so long as any conductive material has suitable electron conductivity without causing adverse chemical changes in the cell. Exemplary examples of the conductive material may include graphite such as natural graphite or artificial graphite; a carbon-based material such as such as carbon black, acetylene black, Ketjen black, channel black, furnace black, lamp black, and summer black; metal powder or metal fiber such as copper, nickel, aluminum, and silver; conductive whisker such as zinc oxide and potassium titanate; conductive metal oxide such as titanium oxide; or a conductive polymer such as polyphenylene derivatives, and one kind of these alone or a mixture of two or more kinds of them may be used.

The conductive material may be contained at a content of 1 wt % to 30 wt % on the basis of the total weight of the negative electrode active material coating portion.

In the electrode assembly, the positive electrode plate includes a positive electrode collector and a positive electrode active material coating portion in which at least one surface, preferably, both surfaces of the positive electrode collector are coated with a positive electrode active material.

In the positive plate, the positive electrode collector may not be particularly limited so long as any positive electrode collector has suitable conductivity without causing adverse chemical changes in the cell. For example, the positive electrode collector may include stainless steel, aluminum, nickel, titanium, sintered carbon, and aluminum or stainless steel having a surface treated with carbon, nickel, titanium, silver, or the like.

The positive electrode collector may have a thickness of 3 μm to 500 μm. In addition, a fine unevenness may be formed on a surface of the positive electrode collector to reinforce adhesion force of the positive electrode active material. For example, the positive electrode collector may have various shapes such as a film, a sheet, a foil, a net, a porous body, a foam body, or a non-woven fabric.

In the positive electrode plate, the positive electrode active material coating portion may be formed by applying the positive active material to both surfaces of the positive electrode collector or applying the positive active material to only one surface of the positive electrode collector. It is preferable that the positive electrode active material coating portion is formed by applying the positive active material to both surfaces of the positive electrode collector in consideration of capacity of the secondary battery.

The positive electrode plate may include insulation tapes on both ends of the positive electrode active material coating portion, i.e., a start portion and an end portion of the positive electrode active material coating portion to prevent the positive electrode plate from being short-circuited during charging and discharging. The insulation tapes may be the same as those of the negative electrode plate.

The positive tab may be conductively attached through welding such as laser welding, ultrasonic welding, and resistance welding or a conductive adhesive. Also, an insulation tape may be attached to the positive electrode tab to prevent the electrodes from being short-circuited.

The unit cell 10 may include electrode tabs extending from the electrode assembly and electrode leads welded to the electrode tabs.

Here, the electrode terminal may be disposed in one direction or both directions of the unit cell.

The electrode terminals may be electrically connected in series or parallel to each other at one side or two sides of the battery module.

In the electrode assembly, the separator interposed between the positive electrode plate and the negative electrode plate may be an insulative thin film having high ion permeability and mechanical strength.

Particularly, the separator may include a porous polymer film, for example, made of a polyolepin-based polymer such as an ethylene homopolymer, a propylene homopolymer, an ethylene/butene copolymer, an ethylene/hexene copolymer, and an ethylene/methacrylate copolymer or at least two-layered stack structure thereof. The separator may be a porous non-woven fabric, for example, a non-woven fabric made of glass fiber with a high melt point or polyethylene terephthalate fiber.

In some cases, a gel polymer electrolyte may be applied to the separator to improve safety of the cell. Representative example of the gel polymer may include polyethylene oxide, polyvinylidene fluoride, or polyacrylonitrile. When a solid electrolyte such as a polymer is used as the electrolyte, the solid electrolyte may also serve as the separator.

A pore contained in the separator may have a diameter of 0.01 μm to 10 μm.

The separator may have a thickness of 50 μm to 300 μm.

It is preferable that the separator extends longer than an end portion of the negative electrode plate to block the negative electrode even though the separator is contracted by heat. Particularly, the separator may extend by 5 mm or more from the end portion of the negative electrode plate.

Battery Pack

Furthermore, according to further another embodiment of the present invention, a battery pack including the battery module is provided.

The battery pack may be used as a power source of at least one medium and large device of a power tool; a vehicle including an electric vehicle (EV), a hybrid electric vehicle (HEV), and a plug-in hybrid electric vehicle (PHEV); and a system for storing power.

Hereinafter, an embodiment of the present invention will be described in detail in such a manner that the technical idea of the present invention may easily be carried out by a person with ordinary skill in the art to which the invention pertains. The present invention may, however, be embodied in different forms and should not be construed as limited to the embodiments set forth herein.

(Embodiment: Manufacture of Secondary Battery Module)

A flat plate-type Al cooling plate having the structure of FIG. 1 was prepared (a thickness a1 of a first plate: 0.5 mm, a thickness b1 of a second plate: 0.5 mm, a height c1 of a first rib: 0.3 mm, a height d1 of a second rib: 0.3 mm, a spaced distance e1 between a first rib end and a second rib end: 0.2 mm, a width of each of the first and second ribs: 0.2 mm, a spaced distance between the first rib and the second rib: 0.2 mm, a width of a partition part: 0.5 mm, a thickness of a cooling plate: 1.7 mm, and an aperture: 80% by volume).

A stacking/folding-type electrode assembly having a bicell structure was accommodated in a dry room so that electrode terminals are disposed in one direction in each of the electrode assembly of an outer shell, and then, a 1M LiPF6 carbonate-based electrolyte was injected. Thereafter, an outer circumferential surface of the outer shell was thermally fused to manufacture 29 pouch-type unit cells.

Next, the prepared cooling plate was disposed in a module case made of an Al material so that the inside of the module case is partitioned into 29 spaces, and then, the 29 unit cells were accommodated one by one into the spaces so that the unit cells are closely attached to the cooling plate. Here, the electrode terminals of the 29 unit cells were accommodated in the same direction to protrude from only one surface of the battery module.

Next, one terminal assembly was manufactured so that connection between the accommodated unit cells and between the unit cells and an external terminal is performed at once. Here, terminal holes into which the electrode terminals of all the unit cells are inserted were formed in the terminal assembly. The inserted electrode terminals of the unit cells were connected to each other in series by being coupled to a bus bar that is previously provided in the terminal assembly, and the bus bar may be previously connected to an input/output terminal protruding to the outside of the terminal assembly. Thereafter, the terminal assembly was coupled to the portion at which the electrode terminals are disposed and then welded to a case body to manufacture a battery module having a structure in which the module case is completely sealed.

Comparative Example 1: Manufacture of Secondary Battery Module

A battery module was manufactured by performing the same method as the embodiment except that the cooling plate is not used in the embodiment.

Comparative Example 2: Manufacture of Secondary Battery Module

A battery module was manufactured by performing the same method as the embodiment except that a flat plate type aluminum cooling plate (thickness: 1.7 mm) is used instead of the cooling plate in the embodiment.

Experimental Example 1: Heat Release Effect Evaluation

A heat release effect within the battery module with respect to the cooling plate according to the embodiment was evaluated.

In detail, 29 unit cells having a bicell structure were stacked by being interposed into each of the cooling plates according to the embodiment and Comparative Example 2 to manufacture a battery module (29 stack 42 Ah battery) The manufactured battery module was charged at a temperature of 25° C. with 1 C up to 4.2V/38 mA under the condition of constant current/constant voltage (CC/CV), and discharged with 1 C up to 3.0 V under the condition of constant current (CC). Whether a temperature increases was observed by performing the same method as the above-described method except that a discharge C-rate is variously changed as shown in Table 1. The results thereof were shown in Table 1 below.

TABLE 1

| | Comparative Example 2 | | Embodiment | |
|---|---|---|---|---|
| Discharge C-rate | Increase of temperature (° C.) | Decrease of temperature after rest step for 30 minutes (° C.) | Increase of temperature (° C.) | Decrease of temperature after rest step for 30 minutes (° C.) |
| 0.5 C | 3 | −3 | 2 | −2 |
| 1.0 C | 7 | −7 | 3 | −3 |
| 2.0 C | 13 | −11 | 6 | −5 |

According to the experimental results, in Comparative Example 2, when discharged with 2 C, the temperature increases to about 13° C., and heat that increases in temperature was not completely cooled during the rest step, but accumulated. On the other hand, in the embodiment, heat that increases in temperature was cooled almost during the rest step. Thus, in case of the cooling plate according to the embodiment, it was confirmed that heat generated when discharged is scarcely accumulated.

Figure 6:
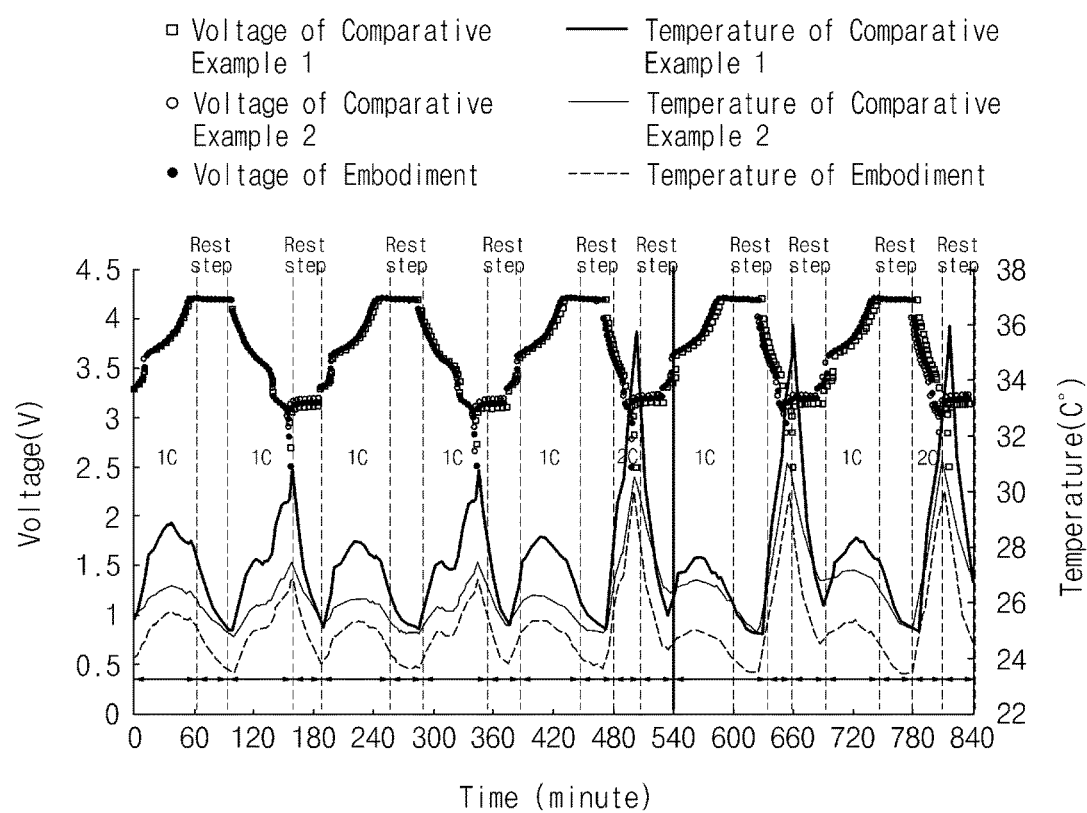
FIG. 6 is a graph illustrating results obtained by observing a heat release effect of the cooling plate in Experimental Example 1.

FIG. 6 is a graph illustrating results obtained by observing the heat release effect of the cooling plate in Experimental Example 1.

According to the results illustrated in FIG. 6, it was seen that the largest increase of the temperature occurs in the battery module according to Comparative Example 1 in which the cooling plate is not provided among the embodiment and Comparative Examples 1 and 2. In case of the battery module according to Comparative Example 2 in which a simple flat plat type cooling plate is used, although the heat release effective is improved, and thus, the increase of the temperature is small when compared to the battery module according to Comparative Example 1, it was seen that the heat release effect is significantly improved in the battery module according to the embodiment in which the cooling plate of the present invention is used when compared to the battery module according to Comparative Example 2.

Experimental Example 2: Battery Lifespan Characteristic Improvement Effect

An effect for preventing a heat accumulation phenomenon, which occurs during a long cycle test of a high-capacity battery cell, with respect to the cooling plate according to the embodiment was evaluated.

In detail, 29 unit cells having a bicell structure were stacked by being interposed into each of the cooling plates according to the foregoing embodiment and Comparative Example 2 to manufacture a battery module (29 stack 42 Ah battery) The manufactured battery module was charged at a temperature of 45° C. with 1 C up to 4.2 V/38 mA under the condition of constant current/constant voltage (CC/CV), and discharged with 1 C up to 3.0 V under the condition of constant current (CC). When this process is defined as 1 cycle, 200 cycles were repeatedly performed. The battery module manufactured through the same method was charged at a temperature of 45° C. with 2 C up to 4.2 V/38 mA under the condition of constant current/constant voltage (CC/CV), and discharged with 2 C up to 3.0 V under the condition of constant current (CC). When this process is defined as 1 cycle, 200 cycles were repeatedly performed. The results thereof were illustrated in FIG. 7.

Figure 7:
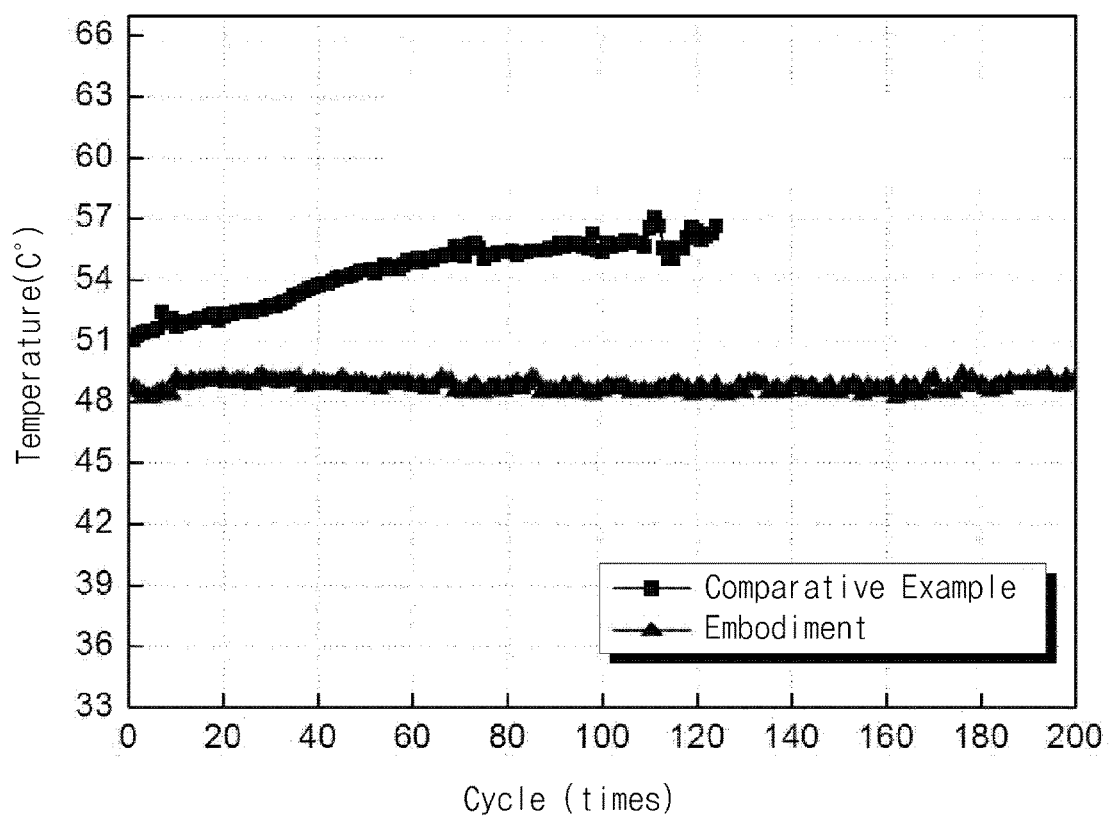
FIG. 7 is a graph illustrating results obtained by observing a cycle property improvement effect of the cooling plate in Experimental Example 2.

As illustrated in FIG. 7, the cooling plate according to the embodiment had the temperature increase suppression effect and the quick cooling effect when discharged. Thus, it was seen that the heat accumulation phenomenon is alleviated when compared to the cooling plate according to Comparative Example 2. Therefore, it is seen that the cycle characteristics of the battery are improved when applying the cooling plate according to the present invention.

Experimental Example 3: Penetration Test

The battery modules manufactured according to the embodiment and Comparative Example 2 were charged up to 4.2 V by using ½ C current (CC-CV, 50 mA cut-off), and then, a test for penetrating a steel bar, which has a cross-section with a semicircular shape of which a diameter is 1 cm, at a speed of 5 cm/minute was performed.

According to the experimental results, a through-hole was formed in each of all the cooling plates of the secondary battery modules according to the embodiment and Comparative Example 2. However, the through-hole formed in the cooling plate according to the embodiment had a diameter of 3 mm, which is less than that (4 mm) of the through-hole in Comparative Example 2. Also, in the unit cell adjacent to the cooling plate including the through-hole, the number of unit cells in which the through-hole or deformation occurs, was reduced when compared to Comparative Example 2. That is, three through-holes or deformation occurred in the embodiment, and four through-holes or deformation occurred in Comparative Example 2.

According to the results, in case of the cooling plate according to Comparative Example 2, since a nail penetration pressure is applied in a penetration direction (or a vertical direction), the deformation of the cooling plate is transmitted to the adjacent unit cell in the same direction. On the other hand, in case of the cooling plate according to an embodiment, when the nail is penetrated, an empty space within a cooling part of the cooling plate is spread, and thus, the penetration pressure is horizontally transmitted to the adjacent cooling parts, and the adjacent cooling parts are deformed while absorbing the penetration pressure. As a result, the effect of the deformation of the cooling plate on the adjacent unit cells may be reduced to reduce an occurrence of short-circuit.

Figure 8:
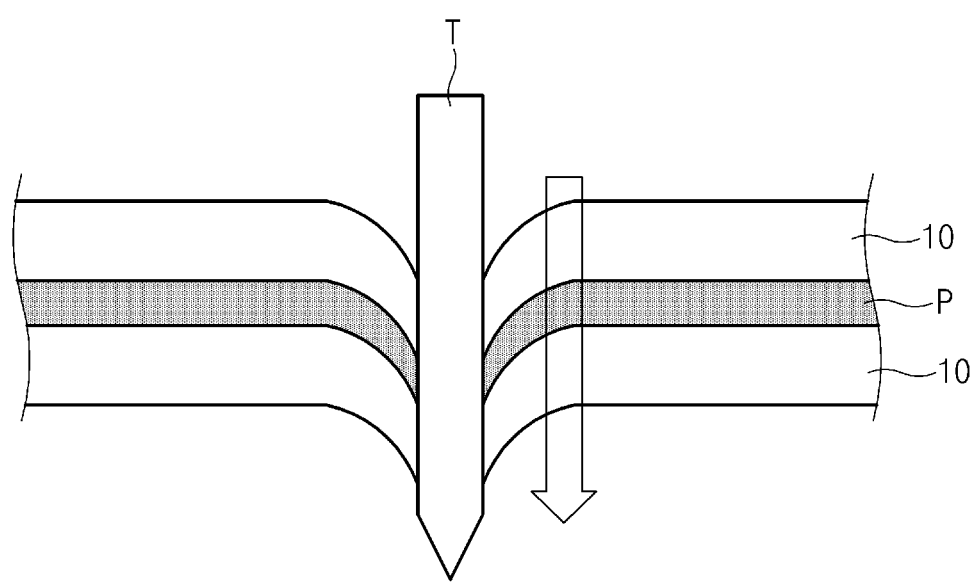
FIG. 8 is a view illustrating a nail penetration test when a flat plate-type cooling plate is installed.
Figure 9:
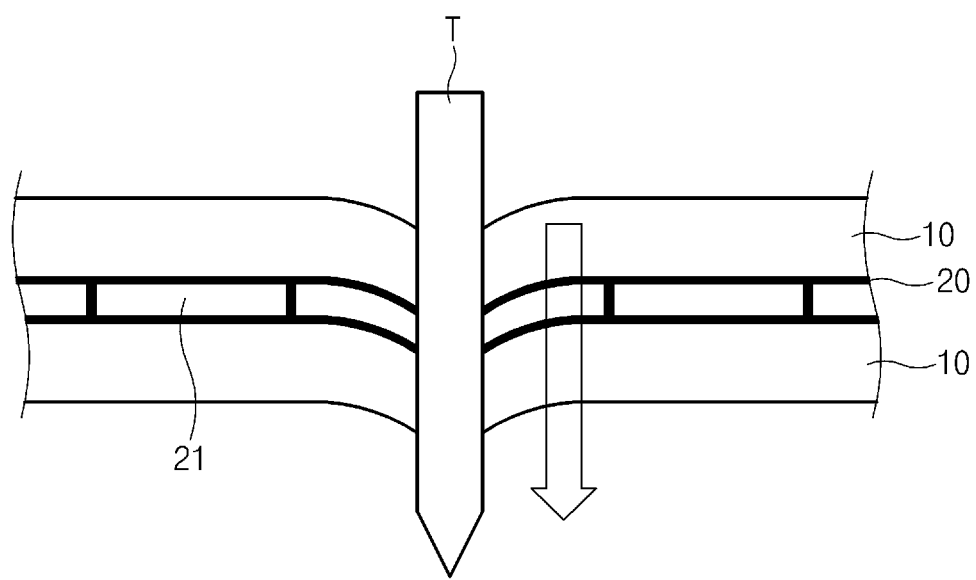
FIG. 9 is a view illustrating a nail penetration test when the cooling plate according to an embodiment of the present invention is installed.

FIG. 8 is a view illustrating the nail penetration test when the flat plate type cooling plate is installed. FIG. 9 is a view illustrating the nail penetration test when the cooling plate according to an embodiment of the present invention is installed.

Referring to FIG. 8, when the nail (or the steel bar) T is penetrated, since the existing flat plate type cooling plate P is a single type plate, in which an inner space does not exist, deformation due to a thickness of the plate itself may be large.

However, referring to FIG. 9, since the cooling plate 20 having a double structure according to an embodiment of the present invention has an empty inner space due to the existence of the cooling part 21, deformation in a thickness direction thereof may be reduced by the empty space. Thus, when the cooling plate 20 having the double structure having the empty inner space is applied, the deformation of the plate due to the penetration of the nail T may be reduced, and thus, deformation of a lower unit cell 10 may be reduced to reduce the short-circuit accident of the unit cell 10.

In more detail, although the foregoing embodiment is described by applying the case in which the first plate 20*a* and the second plate 20*b* are separably coupled to each other, the effect for reducing the short-circuit accident may be achieved by only the cooling part having the empty space because the deformation of the unit cell when the nail (or the steel bar) is penetrated is reduced. Thus, it is unnecessary that the first plate 20*a* and the second plate 20*b* have to be separably coupled to each other.

Thus, the first plate 20*a* and the second plate 20*b* may be separably coupled to each other for convenience of assembly, whereas the first plate 20*a* and the second plate 20*b* may be integrally manufactured.

Another Embodiment in which Heat Absorption Material or Phase Change Material is Applied Another embodiment in which a heat absorption material is applied to the cooling plate according to the present invention may be embodied.

In detail, another embodiment of the present invention may be embodied in such a manner in which a heat absorption material (not shown) that is a material capable of absorbing heat within a cooling part 21 provided in a cooling plate 20 of the present invention is injected. That is, the heat absorption material may be provided in the cooling part 21.

When the heat absorption material is injected into the cooling part 21, an amount of heat absorbed from the unit cell 10 by the cooling plate 20 may more increase. Thus, when the heat absorption material is injected into the cooling part 21, performance, safety, reliability, and lifespan of the battery may be more improved.

A gel material containing a large amount of moisture, a liquid having a high ignition point such as silicon oil, or a liquid which does not a flash point (the lowest temperature at which a material generates combustible vapor and is ignited) may be used as the heat absorption material.

Also, further another embodiment may be embodied in such a manner in which a capsule (not shown) is inserted into the cooling part 21 provided in the cooling plate 20 of the present invention. Here, a material that is changeable in phase according to a temperature may be injected into the capsule.

That is, the capsule may be provided in the cooling part 21, and a phase change material may be injected into the capsule. A material having high heat-capacity such as water may be used as the phase change material.

When it is assumed that the phase change material is used in a liquid state, if heat is generated in the unit cell 10, the phase change material may sublimate from a liquid into a gas within the capsule. Here, the phase change material may absorb a large amount of heat. Thus, the cooling plate 20 may effectively absorb heat from the unit cell 10.

As described above, when the large amount of heat is effectively absorbed, an amount of heat absorbed from the unit cell 10 by the cooling plate 20 may significantly increase to more improve the performance, the safety, the reliability, and the lifespan of the battery.

The specific embodiments were described in the detailed description of the present invention as described above. However, embodiments to which various changes are made without departing from the spirit and scope of the present invention are possible. Those technical ideas of the present invention are not intended to be limited to the specific embodiments described herein, but should be defined by the appended claims and equivalents of the claims.

DESCRIPTION OF SYMBOLS

10 Unit cell
20 Cooling plate
20*a* First plate
20*b* Second plate
21 Cooling part
22 Reinforcement rib
22*a* First rib
22*b* Second rib
22*c* Partition part
23 Reinforcement part
100: Secondary battery module

The invention claimed is:

1. A secondary battery module comprising:
   a plurality of chargeable/dischargeable unit cells arranged at a predetermined interval;
   a flat plate type cooling plate interposed between the unit cells, the cooling plate comprising:
      a first plate and a second plate, which are coupled to each other;
      a plurality of cooling parts spaced apart from each other in a longitudinal direction within the cooling plate;
      partition parts that partition the plurality of cooling parts, wherein the partition parts respectively protrude from inner surfaces of the first and second plates so that ends of the partition parts come into contact with each other;

a plurality of reinforcement ribs including a first rib protruding from the first plate and a second rib protruding from the second plate, the plurality of reinforcement ribs disposed within the cooling parts, wherein the first and second ribs are disposed to face each other, and ends of the first and second ribs are spaced a predetermined distance from each other; and a reinforcement part integrated with the cooling part for installing and supporting the cooling plate within the secondary battery module on an upper portion of the cooling part, wherein the cooling part comes into contact with a heat generation surface of the unit cell, and the reinforcement part extends beyond a dimension of the unit cell in the longitudinal direction, wherein the cooling part has a length and a width that are perpendicular to each other and that are each perpendicular to the longitudinal direction, wherein the reinforcement part has a length and a width that are perpendicular to each other and that are each perpendicular to the longitudinal direction, wherein the length of the cooling part is the same as the length of the reinforcement part, and wherein the width of the cooling part is the same as the width of the reinforcement part.

2. The secondary battery module of claim 1, wherein each of the partition parts has a width of 0.1 mm to 2 mm.

3. A secondary battery module comprising:
a plurality of chargeable/dischargeable unit cells arranged at a predetermined interval;
a flat plate type cooling plate interposed between the unit cells, the cooling plate comprising:
  a first plate and a second plate, which are coupled to each other;
  a plurality of cooling parts spaced apart from each other in a longitudinal direction within the cooling plate;
  partition parts that partition the plurality of cooling parts, wherein the partition parts respectively protrude from inner surfaces of the first and second plates so that ends of the partition parts come into contact with each other;
  a plurality of reinforcement ribs including a first rib protruding from the first plate and a second rib protruding from the second plate, the plurality of reinforcement ribs disposed within the cooling parts, wherein the first and second ribs are disposed to face each other, and ends of the first and second ribs are spaced a predetermined distance from each other; and
  a reinforcement part integrated with the cooling part for installing and supporting the cooling plate within the secondary battery module on an upper portion of the cooling part,
wherein the cooling part comes into contact with a heat generation surface of the unit cell, and the reinforcement part extends beyond a dimension of the unit cell,
wherein the ends of the first and second ribs are spaced a distance corresponding to a thickness greater than 0.005 times to 0.15 times than that of the cooling plate from each other.

4. A secondary battery module comprising:
a plurality of chargeable/dischargeable unit cells arranged at a predetermined interval;
a flat plate type cooling plate interposed between the unit cells, the cooling plate comprising:
  a first plate and a second plate, which are coupled to each other;
  a plurality of cooling parts spaced apart from each other in a longitudinal direction within the cooling plate;
  partition parts that partition the plurality of cooling parts, wherein the partition parts respectively protrude from inner surfaces of the first and second plates so that ends of the partition parts come into contact with each other;
  a plurality of reinforcement ribs including a first rib protruding from the first plate and a second rib protruding from the second plate, the plurality of reinforcement ribs disposed within the cooling parts, wherein the first and second ribs are disposed to cross each other, and ends of the first and second ribs overlap each other; and
  a reinforcement part integrated with the cooling part for installing and supporting the cooling plate within the secondary battery module on an upper portion of the cooling part,
wherein the cooling part comes into contact with a heat generation surface of the unit cell, and the reinforcement part extends beyond a dimension of the unit cell in the longitudinal direction,
wherein the cooling part has a length and a width that are perpendicular to each other and that are each perpendicular to the longitudinal direction,
wherein the reinforcement part has a length and a width that are perpendicular to each other and that are each perpendicular to the longitudinal direction,
wherein the length of the cooling part is the same as the length of the reinforcement part, and
wherein the width of the cooling part is the same as the width of the reinforcement part.

5. The secondary battery module of claim 4, wherein ends of the first and second ribs are disposed in a straight line.

6. The secondary battery module of claim 1, wherein each of the first and second plates has a thickness greater 0.2 times to 0.5 times than that of the cooling plate.

7. The secondary battery module of claim 1, wherein each of the first and second ribs independently has a height corresponding to a thickness greater 0.1 times to 0.3 times than that of the cooling plate.

8. The secondary battery module of claim 1, wherein the first rib is provided in plurality and has a width of 0.1 mm to 1 mm, and the plurality of first ribs are spaced a distance of 0.1 mm to 1 mm from each other.

9. The secondary battery module of claim 1, wherein the second rib is provided in plurality and has a width of 0.1 mm to 1 mm, and the plurality of second ribs are spaced a distance of 0.1 mm to 1 mm from each other.

10. The secondary battery module of claim 1, wherein each of the first and second ribs independently has one shape selected from the group consisting of a rectangular shape, a hemispherical shape, and a pyramid shape.

11. The secondary battery module of claim 1, wherein the cooling plate comprises one or two or more materials selected from the group consisting of aluminum, an aluminum alloy, stainless steel, copper, silver, and aluminum oxide.

12. The secondary battery module of claim 1, wherein the cooling plate has a thickness of 1.5 mm to 3 mm.

13. The secondary battery module of claim 1, wherein the cooling plate has an aperture ratio of 70% by volume to 90% by volume.

14. The secondary battery module of claim 1, wherein the cooling plate has a size corresponding to that of each of the unit cells.

15. The secondary battery module of claim 1, wherein a heat absorption material is provided in the cooling part, wherein the heat absorption material is a gel or a liquid.

16. The secondary battery module of claim 1, wherein a capsule is provided in the cooling part, and a phase change material is injected into the capsule.

17. The secondary battery module of claim 1, wherein a heat absorption material is provided in the cooling part, wherein the heat absorption material is silicon oil.

18. The secondary battery module of claim 16, wherein the phase change material is water.

19. The secondary battery module of claim 4, wherein the ends of the first and second ribs overlap by a height corresponding to a thickness greater 0.05 times to 0.1 times than that of the cooling plate.

20. The secondary battery module of claim 1, wherein the reinforcement part is integrated with an upper portion of the cooling part.

21. The secondary battery module of claim 1, wherein the reinforcement part is a rectangular flat plate provided as a separate member from the cooling part and bonded to the cooling part through welding.

\* \* \* \* \*